US011059420B2

(12) United States Patent
Pyzik et al.

(10) Patent No.: US 11,059,420 B2
(45) Date of Patent: Jul. 13, 2021

(54) ACOUSTIC VEHICLE ALERTING SYSTEM AND METHOD

(71) Applicant: VOLVO CAR CORPORATION, Gothenburg (SE)

(72) Inventors: Aleksandra Pyzik, Gothenburg (SE); Pontus Larsson, Mölndal (SE)

(73) Assignee: VOLVO CAR CORPORATION, Göteborg (SE)

( * ) Notice: Subject to any disclaimer, the term of this patent is extended or adjusted under 35 U.S.C. 154(b) by 67 days.

(21) Appl. No.: 16/409,226

(22) Filed: May 10, 2019

(65) Prior Publication Data

US 2020/0238902 A1 Jul. 30, 2020

Related U.S. Application Data

(60) Provisional application No. 62/797,079, filed on Jan. 25, 2019.

(51) Int. Cl.
*B60Q 5/00* (2006.01)
*G10K 15/02* (2006.01)
*H04R 3/12* (2006.01)

(52) U.S. Cl.
CPC ............. *B60Q 5/008* (2013.01); *G10K 15/02* (2013.01); *H04R 3/12* (2013.01); *H04R 2499/13* (2013.01)

(58) Field of Classification Search
CPC .......... B60Q 5/008; G10K 15/02; H04R 3/12; H04R 2499/13
See application file for complete search history.

(56) References Cited

U.S. PATENT DOCUMENTS 5,371,802 A * 12/1994 McDonald ............ G10K 15/02
381/110
5,635,903 A * 6/1997 Koike .................... A63H 17/34
340/384.1
(Continued)

OTHER PUBLICATIONS

Cordioli, Julio & Trichês Jr, M & Gerges, Samir. (2004). Applications of the Statistical Energy Analysis to Vibro-Acoustic Modeling of Vehicles. SAE Technical Papers. 10.4271/2004-01-3352.
(Continued)

*Primary Examiner* — Hai Phan
*Assistant Examiner* — Son M Tang
(74) *Attorney, Agent, or Firm* — Berenato & White, LLC

(57) ABSTRACT

The invention discloses a method and system for providing an acoustic sound design for an electrified vehicle Acoustic Vehicle Alerting System (AVAS). The method minimizes annoyance from sound leaking into a vehicle compartment. Road and other functional vehicle made sounds (tread noise, fans, wind noise etc.) are used to create an alert sound that mimics these existing vehicle sounds and can be potentially masked, interiorly, by those same sounds. The sounds are recorded and thereafter shaped, amplified and broadcast by speaker(s) placed outside the interior cabin, i.e., one in an engine compartment and another at a rear of the vehicle, so that vulnerable road users can hear the approaching hybrid/ electric vehicle. The sound meets jurisdictional requirements in accord with specified frequencies and sound levels. The result is an alert sound perceived as non-irritating and pleasant outside the vehicle, and unobtrusive and background inside the vehicle.

19 Claims, 13 Drawing Sheets

(56) References Cited

U.S. PATENT DOCUMENTS

| | | | | |
|---|---|---|---|---|
| 6,859,539 | B1* | 2/2005 | Maeda | H04R 5/04 |
| | | | | 381/163 |
| 7,979,147 | B1* | 7/2011 | Dunn | G10K 15/02 |
| | | | | 700/94 |
| 8,045,725 | B2* | 10/2011 | Theobald | G10K 11/178 |
| | | | | 381/71.4 |
| 8,299,904 | B2* | 10/2012 | Konet | G10K 15/02 |
| | | | | 340/384.1 |
| 8,378,804 | B2* | 2/2013 | Inoue | B60Q 5/008 |
| | | | | 340/463 |
| 8,669,858 | B2 | 3/2014 | Yoshino et al. | |
| 9,315,149 | B1* | 4/2016 | Fairchild | B60R 21/34 |
| 9,893,699 | B2 | 2/2018 | Zollner | |
| 10,000,152 | B1* | 6/2018 | Scalea | B60Q 9/008 |
| 10,406,976 | B2* | 9/2019 | Bednar | H04R 1/025 |
| 10,611,302 | B2* | 4/2020 | Lee | B60Q 5/008 |
| 2002/0011928 | A1* | 1/2002 | Williams | B60Q 9/006 |
| | | | | 340/436 |
| 2002/0180597 | A1* | 12/2002 | Flick | B60Q 1/22 |
| | | | | 340/436 |
| 2009/0066499 | A1* | 3/2009 | Bai | G10K 15/04 |
| | | | | 340/459 |
| 2010/0266135 | A1 | 10/2010 | Theobald et al. | |
| 2011/0175718 | A1* | 7/2011 | Inoue | B60Q 5/008 |
| | | | | 340/463 |
| 2011/0199199 | A1* | 8/2011 | Perkins | B60Q 9/008 |
| | | | | 340/435 |
| 2011/0241868 | A1* | 10/2011 | Iwamoto | B60Q 5/008 |
| | | | | 340/463 |
| 2012/0166042 | A1* | 6/2012 | Kokido | B60Q 5/008 |
| | | | | 701/36 |
| 2014/0266658 | A1* | 9/2014 | Feldman | B60Q 5/005 |
| | | | | 340/438 |
| 2014/0294190 | A1* | 10/2014 | Kobiela | G10K 11/17857 |
| | | | | 381/71.4 |
| 2014/0325236 | A1* | 10/2014 | Kim | G06F 21/62 |
| | | | | 713/189 |
| 2016/0012813 | A1* | 1/2016 | Every | G10L 21/02 |
| | | | | 381/66 |
| 2018/0050635 | A1* | 2/2018 | Vincent | B60Q 9/008 |
| 2019/0071011 | A1* | 3/2019 | Konno | B60Q 5/008 |

OTHER PUBLICATIONS

Lin Y., Abdulla W.H. (2015) Principles of Psychoacoustics. In: Audio Watermark. Springer, Cham. https://doi.org/10.1007/978-3-319-07974-5_2.

Massimo Garaia and Paolo Guidorzi (2000) European methodology for testing the airborne sound insulation characteristics of noise barriers in situ: Experimental verification and comparison with laboratory data. The Journal of the Acoustical Society of America.

European Search Report dated Jun. 24, 2020 from corresponding European Patent Application No. 20153467.4; 12 pages.

Pallas et al, "Noise emission of electric and hybrid electric vehicles : deliverable Forever (n° Forever WP2_D2-1-V4)". [Research Report] IFSTTAR—Institut Français des Sciences et Technologies des Transports, de l'Aménagement et des Réseaux., Jan. 2015, 134 pgs., HAL Id: hal-02177735 Retrieved from the Internet: URL: https://hal.archives-ouvertes.fr/hal-02177735/document [retrieved on Jun. 10, 2020].

* cited by examiner

Reference: Lin Y., Abdulla W.H. (2015) Principles of Psychoacoustics. In: Audio Watermark. Springer, Cham

ACOUSTIC VEHICLE ALERTING SYSTEM AND METHOD

FIELD OF THE INVENTION

The invention relates to providing an acoustic indication of the presence and/or approach of a vehicle. The invention particularly relates to creating, shaping and amplifying sound typically associated with the vehicle to make it audible according to legal requirements outside the vehicle and simultaneously non-irritating to those inside or operating the vehicle.

BACKGROUND OF THE INVENTION

Vehicle traffic has historically been a source of ongoing regulation for congestion, pollution, and noise. In the early years, vehicles moved, simply, much faster than horse drawn conveyances, and foot traffic had to adjust, and crossing locations and traffic lights developed from this need. Mufflers and pollution control developed to attenuate noise and smog, and now exterior safety systems to try and provide a "soft-landing" to struck pedestrians are also regulated.

Electric Vehicles (EV) and Hybrid Vehicles (HV) in electric mode are often too quiet to be heard, especially at low speeds (in town operation). To reduce the risk of pedestrian collisions, especially for the visually impaired the Acoustic Vehicle Alerting System (AVAS) is introduced to warn the vulnerable road users of approaching hybrid/electric vehicles. Governmental regulations now require that the electrified vehicles which are able to operate in reverse or at least one forward drive gear, without an internal combustion engine operating, need to fulfil certain "sound" requirements.

Various solutions have been proposed to solve these "quiet" problems.

U.S. Pat. No. 8,045,725 discloses an electric drive mode for a vehicle including a noise making function. A controller generates an acoustic signal, broadcasts the acoustic signal via a first set of exterior speakers during an electric drive mode, and generates and broadcasts a cancelling signal via a second set of interior speakers. The broadcasts are coordinated to substantially cancel an attenuated portion of the acoustic signal resulting from propagation of the acoustic signal into the interior. A method cancels a synthesized sound within a vehicle interior by collecting vehicle operating values, generating an acoustic signal as the synthesized sound during an electric drive mode, and processing the acoustic signal to generate a modified acoustic signal approximating an attenuated portion of the acoustic signal propagating into the vehicle interior. This system and method are rather complex, costly and non-efficient. They require robust and accurate operation for all operating conditions, i.e., cold/hot/dust, etc. with equal efficacy. In the "real" world of vehicle operation, this is difficult, if not impossible, to achieve, especially in the long term.

U.S. Pat. No. 8,669,858 discloses a vehicle notification sound emitting apparatus that can emit a moving notification sound (e.g., either a forward movement notification sound or a different reverse movement notification sound) that can be heard easily by a person in an outside area surrounding the vehicle, but which does not easily penetrate a cabin interior of the vehicle from outside the vehicle. Thus, with this type of vehicle notification sound emitting apparatus, a person in an outside area surrounding the vehicle can hear the movement notification sound in a reliable fashion without using a sound volume increasing device or other special measures, and avoid a situation in which an unnecessary movement notification sound penetrates into the cabin interior that becomes unpleasant for a driver and/or passenger. The system accounts for ambient sound of the exterior environment and increases the sound to account for these conditions. However, the '858 solution proposes the use of sound of frequency in a range of 1.5 kHz to 6 kHz. That way the emitted sound is audible outside the vehicle but is attenuated towards the interior and thus is not annoying for the vehicle's users.

Current government requirements on sound emission of electric vehicles at low speeds require, however, that the emitted sound has at least one component below 1000 kHz (in US) and at least one component equal or below 1.6 kHz (in EU, China and Rest of the World). Additionally, the high frequency components could possibly increase the annoyance and perceived noise pollution outside the vehicle—our testing has, for example, shown that such high frequencies were perceived by the test subjects as harsh, annoying and unnatural.

U.S. Pat. No. 5,635,903 discloses a simulated sound source device to generate a simulated sound signal corresponding to an operating condition of an electric vehicle when it starts, runs and is accelerated or decelerated, and also controls a sound level switcher device to adjust the level of the simulated sound signal. The sound level switcher device is also controlled based on an ambient noise level detected by a noise sensor. For this system, it is likely a loud cityscape would result in a progressively louder cityscape if many of these systems were operated simultaneously.

U.S. Pat. No. 9,893,699 discloses an acoustic alert system whereby upon detection of a collision hazard, a basic synthetic external sound, in particular an un-steered external sound, may be enhanced, e.g. its volume may be increased, and/or an additional synthetic external sound, in particular a steered external sound, may be added to alert the passive road user of the approaching vehicle. This may in particular increase the safety for visually impaired pedestrians. However, it is basically an auto horn blasting device for those whom the vehicle believes may be imperiled by its approach. This system, also, would make for a loud and startling cityscape where many roadside objects and people persist. Additionally, the sensors detecting the hazard(s) between the vehicles and further road users are considered expensive. The government requirements on Acoustic Vehicle Alerting System (AVAS) demands adding the sound solution specifically because all the OEMs are obliged to have it, meaning that non-luxurious brands are not also obliged to invest in active safety features.

U.S. Pat. No. 8,299,904 discloses a method for controlling a vehicle to emanate an audible alert representative of an internal combustion engine (ICE) noise profile. The alert has a sound profile including a simultaneous emanation of first, second and third audible frequency components having first, second and third frequencies, respectively. In operation, the first and second frequencies emanate at first and second sound pressure levels greater than first and second representative sound pressure levels of the ICE noise profile of the first and second frequencies, respectively, and the third frequency emanates at a third sound pressure level less than a third representative sound pressure level of the ICE noise profile at that third frequency. Such a system limits the AVAS exterior sound to be mimicking the sound(s) of combustion engine vehicles. However, the user buying an electrified vehicle has an expectation that such a vehicle is relatively quiet. The electric vehicle user does not necessarily wish to own an electric vehicle that will sound the same as a combustion engine vehicle. Another potential problem arises when the ICE noise profile needs to be created based on ICE vehicle, but the OEM only produces electric vehicles and has no possibility to obtain such ICE noise profile data.

SUMMARY OF THE INVENTION

In the present invention system and method, an acoustic vehicle alerting system (AVAS), road and other operational noises already made by the vehicle, i.e., tread noise, wind noise and fans, are recorded and their various spectra analyzed. A new sound is created in such a way that it fulfills the exterior legal requirements, but is otherwise masked by the other functional vehicle noises interior wise. Essentially the AVAS sound mimics actual vehicle sounds, but their sound spectra are shaped to fulfill the legal requirement, thus in this method some frequencies are elevated and some are attenuated. That way the interior pleasantness increases as the added sound is conceivably quiet towards interior and not perceived as artificial or unwanted as well as not sounding like a malfunctioning vehicle. Furthermore, such a sound design minimizes the environmental noise pollution, as the sound is not intrusive for the other road users and is not perceived as harsh or annoying. On the contrary, it is perceived as of low but expected sound volume.

The current solution adds an external sound for low speed (up to 30 km/h or 40 km/h) to fulfil the legal requirements and the sound is believed to be easily recognizable outside the vehicle to induce safety on the roads. Being a "sound" based solution, the proposed AVAS system requirements herein exclude the need for also implementing active safety features, i.e., expensive hazard and/or pedestrian sensors and collision avoidance alerts and associated systems.

The exterior sound produced by the current system is in accord with certain chosen frequencies and sound levels that are specified in government requirements. The sounds created are not "artificial", i.e., like a spaceship, or a "branded" noise (Jaguar, Prius, etc.), but are instead the noises already made by the vehicle and then shaped and amplified and broadcast by speakers outside the interior cabin of the vehicle. The broadcasted sound is to be non-irritating, pleasant, and expected, i.e., vehicle associated, to persons outside the vehicle, and unobtrusive and "background" to those inside the vehicle. The AVAS sound design focuses on minimizing the annoyance by creating sound that is not perceived as added, but as natural, expected and coherent to passengers inside the vehicle. In this manner the interior sound is not perceived as added and artificial.

The sound levels defined in legal requirements are defined in third octave bands. Essentially, it means that if the tonal sounds are to fulfill the legal requirement, the volume of those sounds would have to be relatively louder than the "noise like" sound already causing an annoyance both interior and exterior wise. That is because noise of the same peak value, as a single tone, contains more energy in a frequency band—the concept is presented in FIG. 12. Thus, the "noise like" approach chosen to implement this method was chosen so to decrease the sound volume as much as possible and still fulfill the legal requirements without a need to broadcast tonal sounds that would be too loud. Additionally, taking into account psychoacoustic perspective, the high tonal sounds draw more attention than "noise like" sounds, which were also considered as more unfavorable in the interior of the vehicle. Tonal sounds are also more difficult to localize than more broadband sounds, which makes noise-like sounds more appropriate also on the exterior since these sounds allow pedestrians and cyclist to better detect where the car is. The next step of the sound design approach was to explore the noise sounds that mimic the existing behavior of the car. The idea being that this sound design could blend in with the other vehicle noises already present and, eventually, could also simply be masked by other vehicle noises on the interior of the vehicle.

In the commercial applications one or more external speakers are used. Often at least one in front, placed in the engine compartment, to sound in the forward movement and one in the rear of the vehicle to sound in the reverse movement. The solution does not specify the exact position of the speakers, but at least one sound apparatus should be used.

The government regulations requiring additional sound are fairly new. And, often, Electric Vehicles (EV) and Hybrid Vehicles (HV) do not include designed in necessary hardware to broadcast AVAS sound. The present AVAS system deals with such issues as it was built on the hardware that was added in the late production stage. In such cases, exterior speaker placement devolves to simply the space not yet occupied by other equipment included at the outset. Such placement of the AVAS hardware is poor and unfavorable from the sound directivity and sound level point of view. Poor placement of the AVAS hardware causes the complex transfer functions between the speaker and the exterior microphones. This typically means that very often the added sound has to be loud in order to fulfil the legal requirements in all regulation measurement points. This causes the sound to become annoying in the interior of the vehicle especially because the users of the electric vehicles expect those to be quiet. The excessive sound leakage into a car compartment makes a user perceive a car as one of poor quality. The sound design proposed in the current solution focuses on minimizing the annoyance by creating sound that is not perceived as added, but as natural, expected and coherent with the car. Additionally, these space restrictions are very often limiting when it comes to the more complex Active Noise Cancellation devices. (For example, those proposed in U.S. Pat. No. 8,045,725.) Hence, "designing" noise cancelling and other complex acoustic systems is both difficult (different car shapes and speaker locations make for different performance and response characteristics and operator/passenger/pedestrian perceptions) and costly.

A system and method according to the present invention is a compromise between the legal requirements—making sure that the pedestrians are warned; Environmental noise pollution—creating the sound that is not too intrusive for the other road users and is not perceived as harsh or annoying; and, Interior pleasantness—making sure that the sound is sufficiently quiet towards the vehicle interior and is not perceived as added or unwanted as well as not sounding as a malfunctioning vehicle.

These and other aspects of the invention will become apparent to one of ordinary skill in this relevant field upon the reading of following description in conjunction with the drawings.

DETAILED DESCRIPTION

Figure 1:
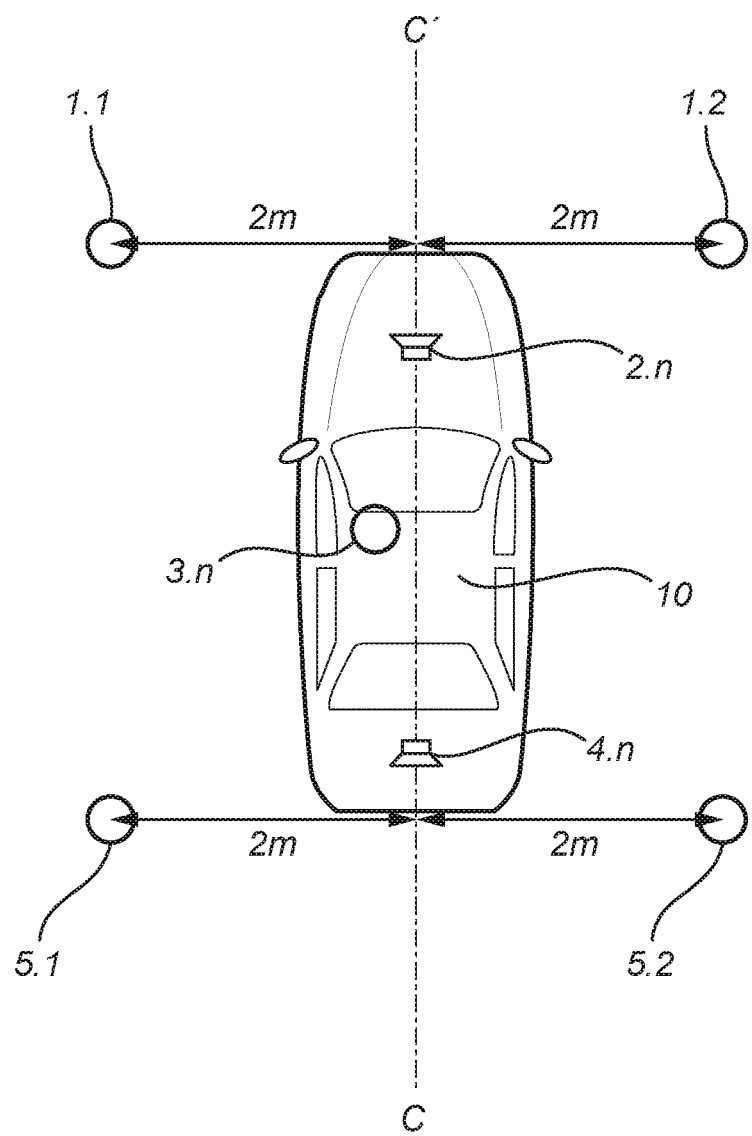
FIG. 1 is a schematic showing the possible location of the sound emitting unit(s) on a vehicle and microphones to record the system created sounds in a test cell.

FIG. 1 shows a schematic of a vehicle equipped with one or more sound emitting units in a system in accord with the present invention as well as the position of microphones to sense the sounds being provided by the system in a testing environment. The vehicle 10, shown from above, is equipped, for example, with a forward speaker 2.$n$, typically mounted within the forward engine compartment of the vehicle 10, and in a protected area beneath most of the engine and drive train components. Likewise, the vehicle is often also equipped with a rear speaker 4.$n$, mounted beneath the rear compartment of the vehicle 10. Each of these forward 2.$n$ and reverse 4.$n$ speakers are robust so as to cope with environmental and operational conditions and they are mounted where feasible for a given vehicle design and available space. This is especially the case for vehicles which are retrofit with hybrid capabilities where available space is at a premium. As well as for the vehicles that did not include the AVAS system before as it was not government requirement.

In FIG. 1, 1.1 shows the location of the front left microphone—positioned according to legal requirements for sound measurement. It is approximately 2 meters to the left of a centreline of the vehicle 10 and is approximately even with the forward extent of the vehicle. 1.2 shows the front right microphone—also positioned according to legal requirements in a mirror position with respect to microphone 1.1. 2.$n$ is the front sounding unit(s) (electroacoustic loudspeaker or similar device), more than 1 could be used. 3.$n$ represents one or more microphones inside the car, positioned at an operator/user's ear position. 4.$n$ is a rear sounding unit(s) (electroacoustic loudspeaker or similar device), again, more than 1 could be deployed. 5.1 is the rear left microphone—positioned according to legal requirements at about 2 meters from the vehicle centreline and to the left and approximately even with the rear extent of the vehicle 10. 5.2 is the rear right microphone—also positioned according to legal requirements in a mirror position to microphone 5.1 Measurement microphones for this test cell and AVAS designated speakers include any that are suitable for this purpose.

The present method for selecting the frequency bands for sound design that are optimal with regards to the acoustic transfer functions may be described as follows and use the following terms. Transfer Functions (TFs) are measured using any existing acoustic measurement equipment employing methods such as linear or logarithmic frequency sweep, white noise, MLS noise or similar. Alternatively, TFs can also be predicted/estimated using (a combination of) suitable acoustic prediction techniques such as Finite Element Method (FEM) and/or Geometrical Acoustics. Specifically, the following TFs are measured or predicted, for example: Between sound emitting unit(s) that are intended to emit sound in forward drive conditions (2.$n$) and front microphones (1.1, 1.2): these are denoted TFF.1 and TFF.2; Between sound emitting unit(s) that are intended to be active in forward drive conditions (2.$n$) and inside microphones (3.$n$): denoted TFFI; Between sound emitting units(s) that are intended to emit sound in reverse drive conditions and rear microphones (5.1, 5.2): denoted TFR.1 and TFR.2; Between sound emitting units(s) that are intended to emit sound in reverse drive conditions and inside microphones (3.$n$): denoted TFRI.

The third-octave band values of all TFs are calculated for the frequency range of interest (depending on legal requirement) starting from 160 or 315 Hz to 5000 Hz.

The absolute value of the differences between left and right exterior TFs are calculated for different frequency bands, f, covering the frequency range of interest in the legal requirement, and for both front and rear conditions:

$$\delta TFF(f)=abs(TFF.1(f)-TFF.2(f)) \quad [1]$$

$$\delta TFR(f)=abs(TFR.1(f)-TFR.2(f)) \quad [2]$$

The differences between exterior (front and rear) and interior TFs are calculated for different third-octave frequency bands, f, covering the frequency range of interest in the legal requirement and for both front and rear conditions:

$$\delta TFEIF.1(f) = TFF.1(f) - TFFI(f) \quad [3]$$

$$\delta TFEIF.2(f) = TFF.2(f) - TFFI(f) \quad [4]$$

$$\delta TFEIR.1(f) = TFR.1(f) - TFRI(f) \quad [5]$$

$$\delta TFEIR.2(f) = TFR.2(f) - TFRI(f) \quad [6]$$

N denotes the number of frequency bands the sound be designed to include. The N frequency bands that have the lowest exterior differences, δTFF(f) and δTFR(f), are identified and denoted $N_{Ff,text}$ and $N_{Rf,ext}$ (front and rear). The N frequency bands that have the largest exterior differences, δTFEIF.x(f) and δTFEIR.x(f), are identified and denoted $N_{Ff,int}$ and $N_{Rf,int}$ The AVAS sound should be designed for the intersection of the frequency bands where the difference between the left and right exterior microphones are as small as possible ($N_{Ff,ext}$) and the frequency bands where the difference between exterior sound level and interior sound is as large as possible ($N_{Rf,int}$):

$$N_{Ff,ext} \cap N_{Ff,int} \text{ for a forward drive condition}$$

$$N_{Rf,ext} \cap N_{Rf,int} \text{ for a reverse drive condition}$$

For the specific case of US requirements, the AVAS sound is also required in a stationary vehicle condition, wherein as soon as the gear selector is put into "Drive" or "Reverse" an AVAS sound is emitted. This is to warn the vulnerable road users that a vehicle can start moving at any moment. For that specific case, an additional third testing/sensing microphone is added in the test cell in front of the vehicle at its centerline, at 2 m distance from the bumper and at 1.2 m height. For that specific case the exterior-to-interior transfer functions could also be measured. Additionally, the left-to-front and right-to-front differences could be measured. This is to ensure that the AVAS sound is designed as well for the specific stationary case.

Figure 2:
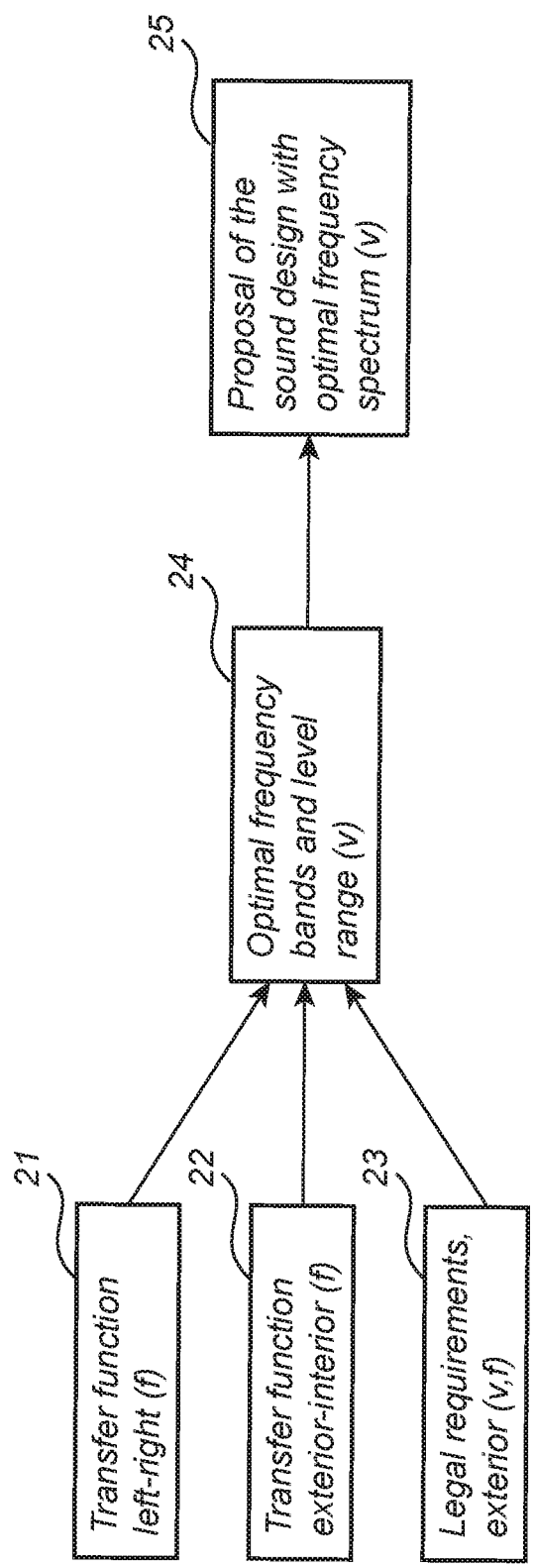
FIG. 2 presents the flowchart showing the method of providing an alert sound in electrified vehicles fulfilling the AVAS legal requirements optimized for transfer function left-to-right and exterior-to-interior in a particular vehicle.

FIG. 2 presents the flowchart showing the method of providing an alert sound in electrified vehicles fulfilling the AVAS legal requirements. The optimal frequency bands and level range 24 are speed dependent and are chosen based on the transfer function left-to-right 21, transfer function exterior-to-interior 22 and legal requirements on the exterior 23. The transfer function left-to-right 21 are frequency dependent and are measured at the external microphones 1.1 and 1.2. The transfer functions describe the sound path from the speaker(s) to the left and right microphones and are denoted as TFF.1 and TFF.2 for the forward drive conditions and TFR.1 and TFR.2 for the reverse drive conditions. The transfer function exterior-to-interior 21 are frequency dependent and are measured at the internal microphone(s) 3.n. The transfer functions describing the sound path from the speaker(s) to the interior microphone(s) are denoted TFFI for the forward drive and TFRI for the reverse drive. The AVAS legal requirements on the exterior sound pressure level 23 are speed and frequency dependent. Based on the optimal frequency bands and level range 24 the proposal of the sound design with optimal frequency spectrum 25 is recommended. The optimal frequency bands and thus also the sound design should be speed dependent to fulfil the AVAS legal requirements 23.

Figure 3:
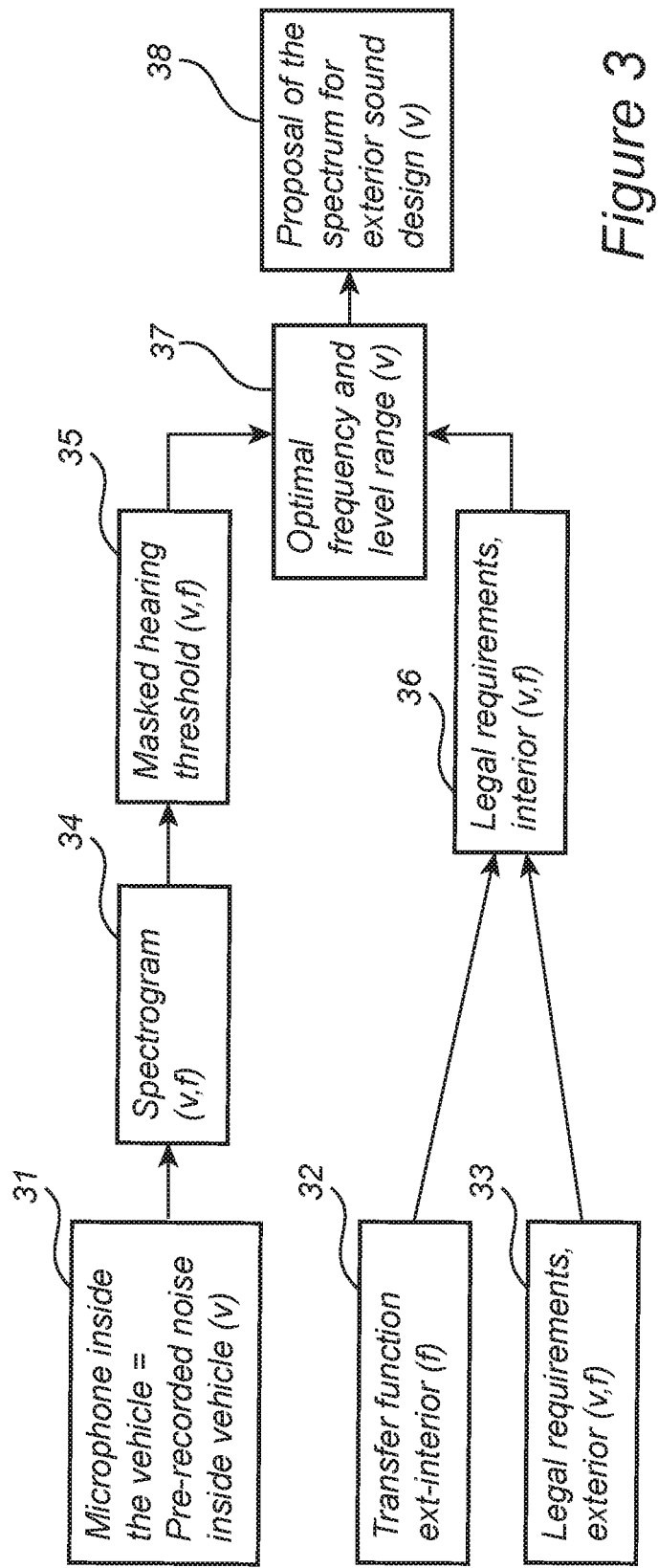
FIG. 3 presents the flowchart showing the method of providing an alert sound in electrified vehicles fulfilling the AVAS legal requirements optimized for transfer function exterior-to-interior and for the pre-recorded interior noise in a particular vehicle. The proposed alert system is below the masked hearing threshold thus it is not audible on the interior of the vehicle.

FIG. 3 presents the flowchart showing the method of providing an alert sound in electrified vehicles fulfilling the AVAS legal requirements. The microphone inside the vehicle 31 is used to record the interior noise in the vehicle for different speeds during the development process. Based on that data, the frequency spectrum 34 is obtained (speed and frequency dependent). The frequency spectrum 34 is used to obtain the masked hearing threshold 35 that is calculated based on the principle presented in FIG. 9. The speed and frequency dependent masked hearing threshold 35 and the legal requirement on the interior 36 define the optimal frequency bands and level range 37. The legal requirement on the interior 36 is a combination of transfer function exterior-to-interior 32 and the legal requirements on the exterior 33. Essentially, it means that the sound levels demanded on the outside are translated towards the interior demands. The concept is presented in FIG. 10. Based on the optimal frequency bands and level range 37 the proposal of the sound design with optimal frequency spectrum 38 is recommended for different speeds (as demanded in legal requirements).

Figure 4:
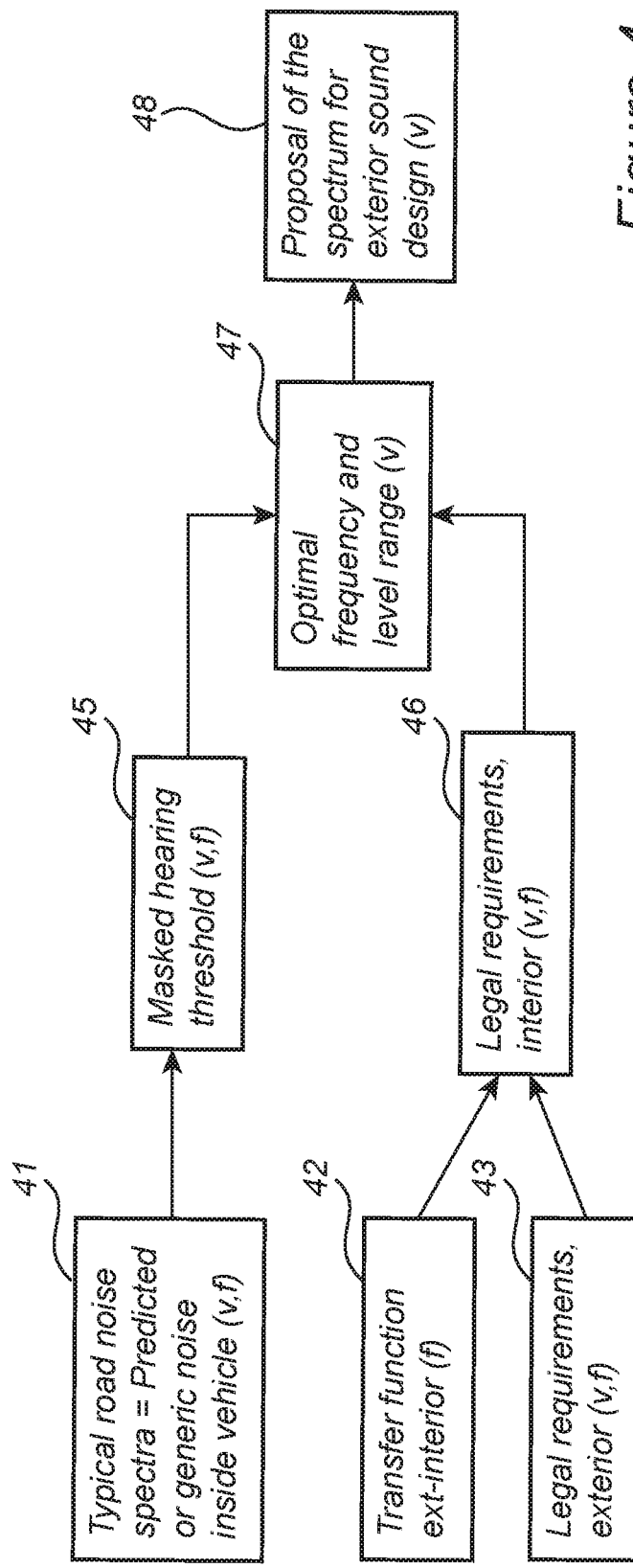
FIG. 4 presents the flowchart showing the method of providing an alert sound in electrified vehicles fulfilling the AVAS legal requirements optimized for transfer function exterior-to-interior and for the predicted interior noise based on the typical road noise spectrum. The proposed alert system is below the masked hearing threshold and thus it is not audible on the interior of the vehicle.

FIG. 4 presents the flowchart showing the method of providing an alert sound in electrified vehicles fulfilling the AVAS legal requirements. Instead of the microphone inside the vehicle 31 that is used to record the interior noise, the solution proposes to use the typical road noise spectra 41. The typical road noise spectra 41 is the predicted (generic) noise inside the vehicle. FIG. 11 presents the data that is typical for the road noise at low speeds (20 km/h and 30 km/h) that can be used. Based on the road noise frequency spectrum 41, the masked hearing threshold 45 is calculated based on the principle presented in FIG. 9. The speed and frequency dependent masked hearing threshold 45 and the legal requirement on the interior 46 define the optimal frequency bands and level range 47. The legal requirement on the interior 46 is a combination of transfer function exterior-to-interior 42 and the legal requirements on the exterior 42. The concept is presented in FIG. 10. Based on the optimal frequency bands and level range 47 the proposal of the sound design with optimal frequency spectrum 48 is recommended for different speeds (as demanded in legal requirements).

Figure 5:
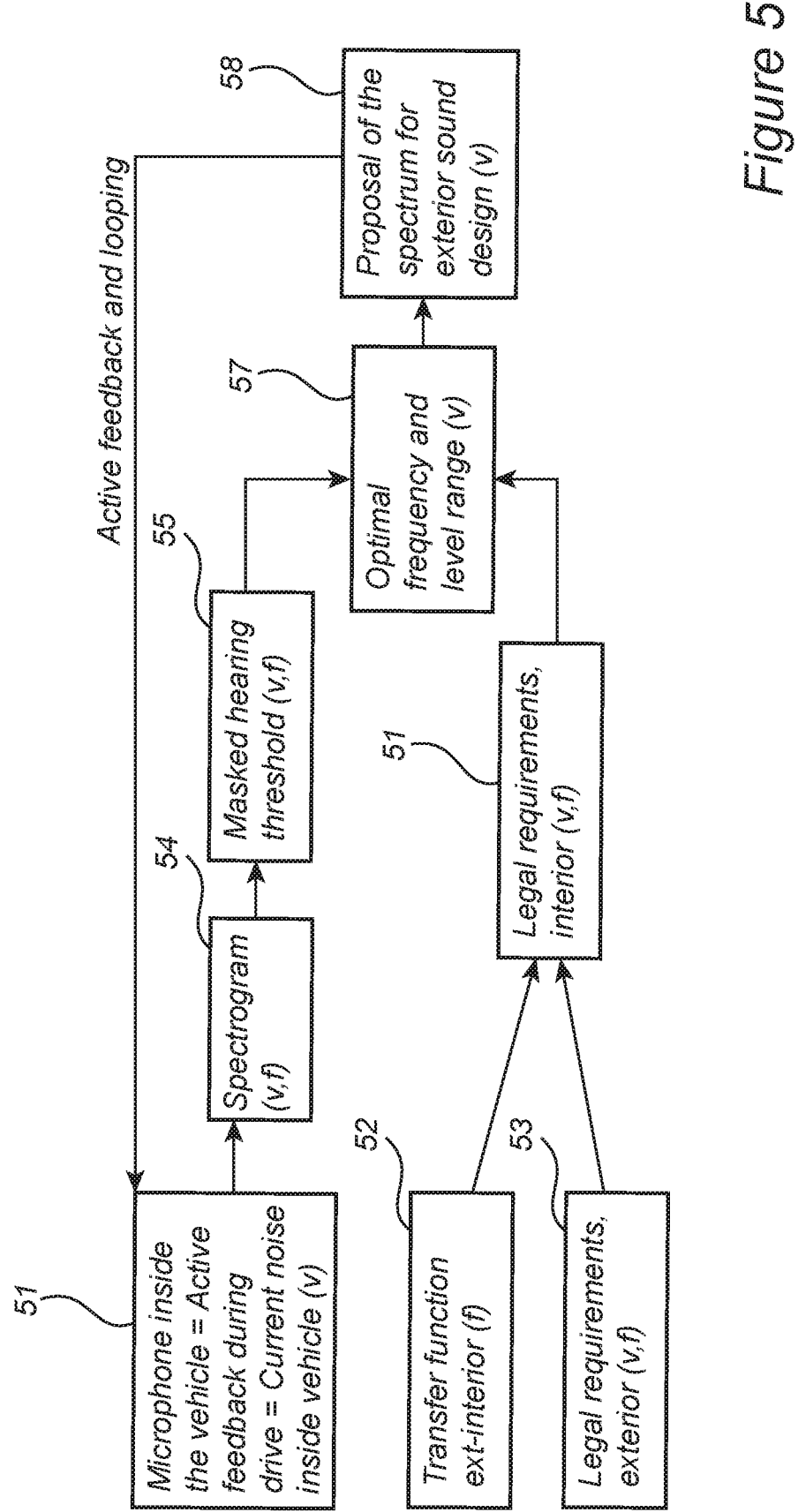
FIG. 5 presents the flowchart showing the method of providing an alert sound in electrified vehicles fulfilling the AVAS legal requirements optimized for transfer function exterior-to-interior and for the interior noise constantly measured by a built-in microphone providing active feedback. The proposed alert system is below the masked hearing threshold thus it is not audible on the interior of the vehicle.

FIG. 5 presents the flowchart showing the method of providing an alert sound in electrified vehicles fulfilling the AVAS legal requirements. The microphone inside the vehicle 31 is used to record the interior noise in the vehicle for different speeds in real time. Based on that data the frequency spectrum 34 is obtained (speed and frequency dependent). The information on the interior noise spectrum is constantly updated using active feedback. This frequency spectrum 34 is used to obtain the masked hearing threshold 35 that is calculated based on the principle presented in FIG. 9. The speed and frequency dependent masked hearing threshold 35 and the legal requirement on the interior 36 define the optimal frequency bands and level range 37. The constantly updating interior noise information allows shaping the emitted exterior sound so it fits the particular vehicle at the particular speed with the certain noise shape due to other functions of the vehicle (i.e. air conditioning). The legal requirement on the interior 36 is a combination of transfer function exterior-to-interior 32 and the legal requirements on the exterior 33. Essentially, it means that the sound levels demanded on the outside are translated towards the interior demands. The concept is presented in FIG. 10. Based on the optimal frequency bands and level range 37 the proposal of the sound design with optimal frequency spectrum 38 is recommended for different speeds (as demanded in legal requirements).

Figure 6:
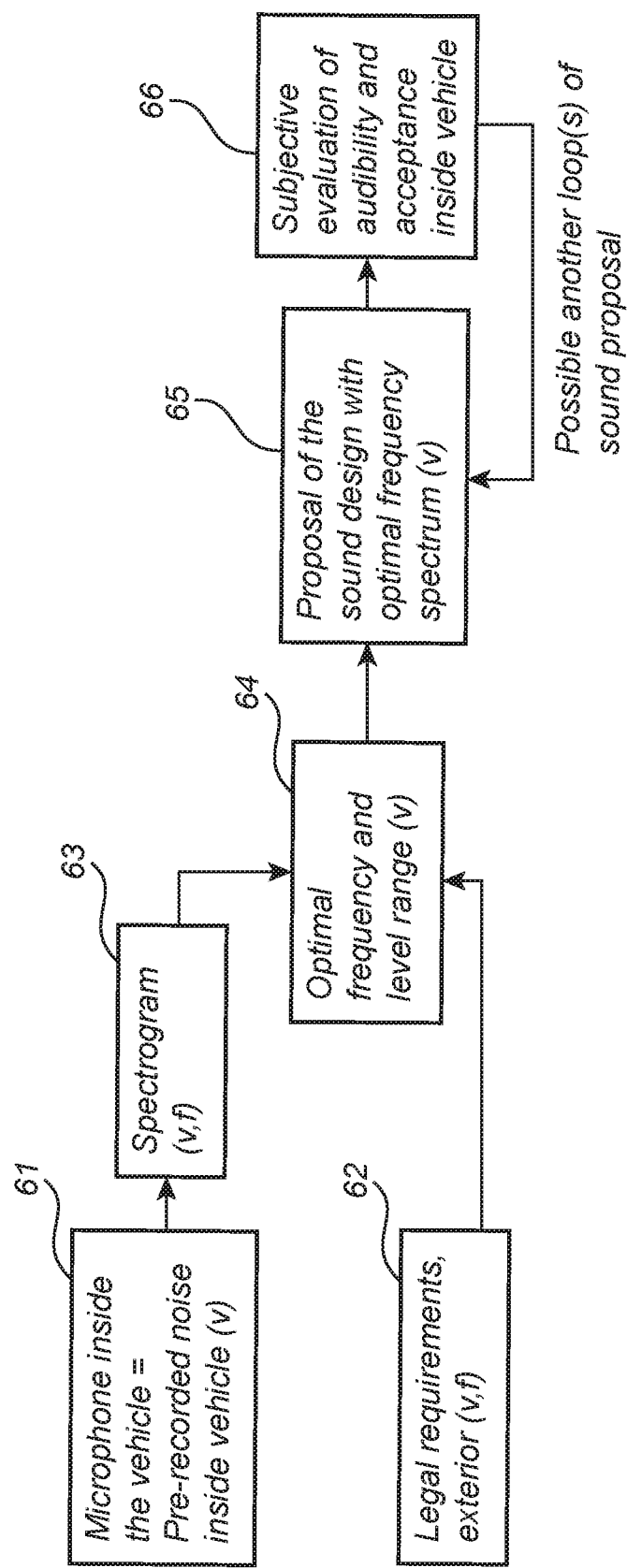
FIG. 6 presents the flowchart showing the method of providing an alert sound in electrified vehicles fulfilling the AVAS legal requirements shaped in a way that it mimics the pre-recorded interior functional vehicle noise spectrum. An audibility of the alert sound and its annoyance are judged subjectively and another loop of the sound design is possible.

FIG. 6 presents the flowchart showing the method of providing an alert sound in electrified vehicles fulfilling the AVAS legal requirements. The interior noise 61 is pre-recorded for different vehicle speeds during the development process as in 31. Based on that data the frequency spectrum 63 is obtained (speed and frequency dependent). The frequency spectrum 63 is a foundation for defining the character of the emitted sound in terms of timbre and frequency. The frequency spectrum 63 and the legal requirement on the exterior 62 define the optimal frequency bands and level range 64. Based on the optimal frequency bands and level range 64 the proposal of the sound design with optimal frequency spectrum 65 is recommended for different speeds (as demanded in legal requirements). Since, in this version of the method, the interior noise is only used to define the characteristic and preferred frequency bands for the alert sound, no masking threshold is obtained since the sound proposal can be audible in the interior of the vehicle. Thus, a step of subjective evaluation of the audibility and acceptance inside vehicle 66 is proposed. After the design, but during the development process, the audibility and level of annoyance of the sound proposal should be judged by a designer and possibly by a larger panel of listeners. If the sound proposal is not judged acceptable another loop(s) of the sound design is recommended. The final proposal fulfills the legal requirement and its character is optimized for the interior noise, but depends greatly on the subjective evaluation of the sound.

Figure 7:
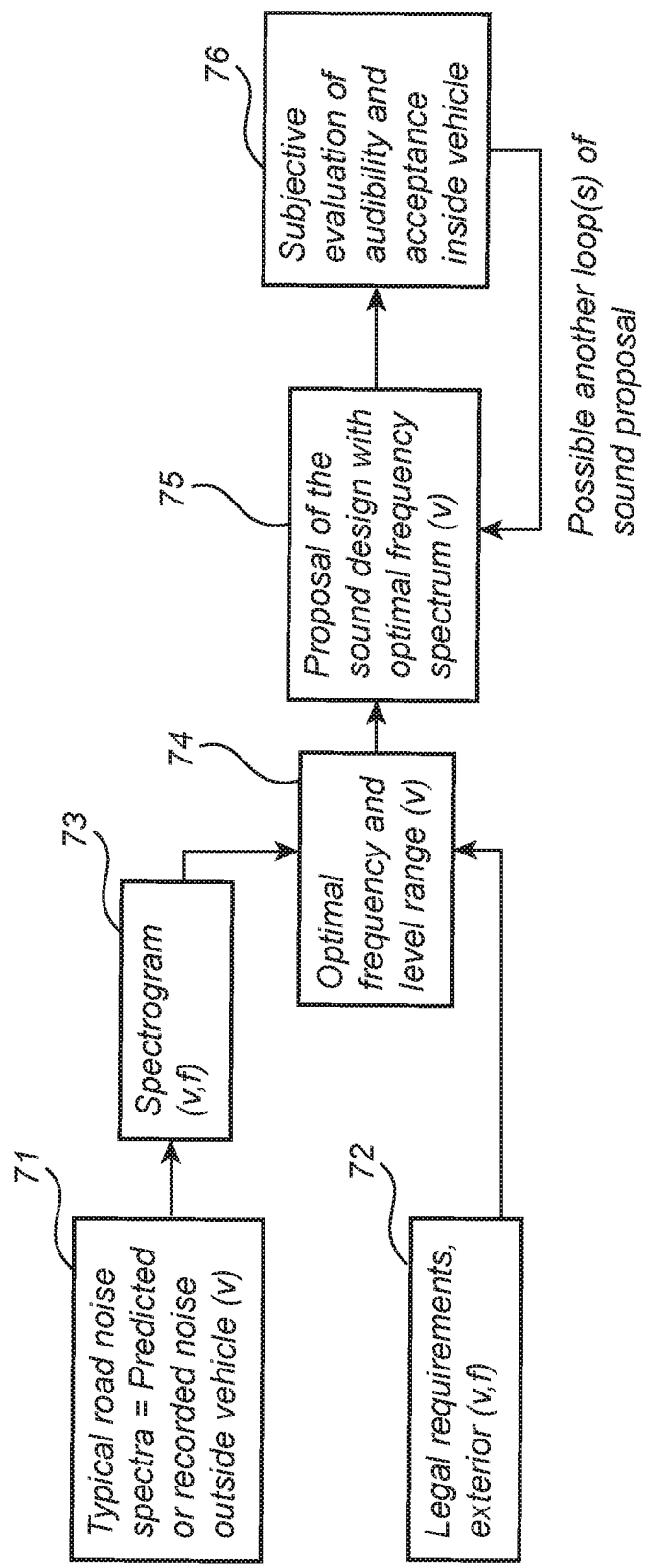
FIG. 7 presents the flowchart showing the method of providing an alert sound in electrified vehicles fulfilling the AVAS legal requirements shaped in a way that it mimics the predicted road noise spectrum. An audibility of the alert sound and its annoyance are judged subjectively and another loop of the sound design is possible.

FIG. 7 presents the flowchart showing the method of providing an alert sound in electrified vehicles fulfilling the AVAS legal requirements. The interior noise 61 is predicted using the typical road noise spectra as in 41. The typical road noise spectra 41 is the predicted (generic) road noise of the vehicle. FIG. 11 presents the data that is typical for the road noise at low speeds (20 km/h and 30 km/h). Based on that data the frequency spectrum 63 is obtained (speed and frequency dependent). The frequency spectrum 63 is the foundation for defining the character of the emitted sound in terms of timbre and frequency. The frequency spectrum 63 and the legal requirement on the exterior 62 define the optimal frequency bands and level range 64. Based on the optimal frequency bands and level range 64, the proposal of the sound design with optimal frequency spectrum 65 is recommended for different speeds (as demanded in legal requirements). Since in this version of the method the interior noise is only used to define the characteristic and preferred frequency bands for the alert sound, again no masking threshold is obtained and the sound proposal can be audible in the interior of the vehicle. Thus, a step of subjective evaluation of the audibility and acceptance inside vehicle 66 is also proposed. After the design, but during the development process, the audibility and level of annoyance of the sound proposal should be judged by a designer and possibly by a larger panel of listeners. If the sound proposal is not judged acceptable another loop(s) of the sound design is recommended. The final proposal fulfills the legal requirement and its character is optimized for the interior noise, but depends greatly on the subjective evaluation of the sound.

Figure 8:
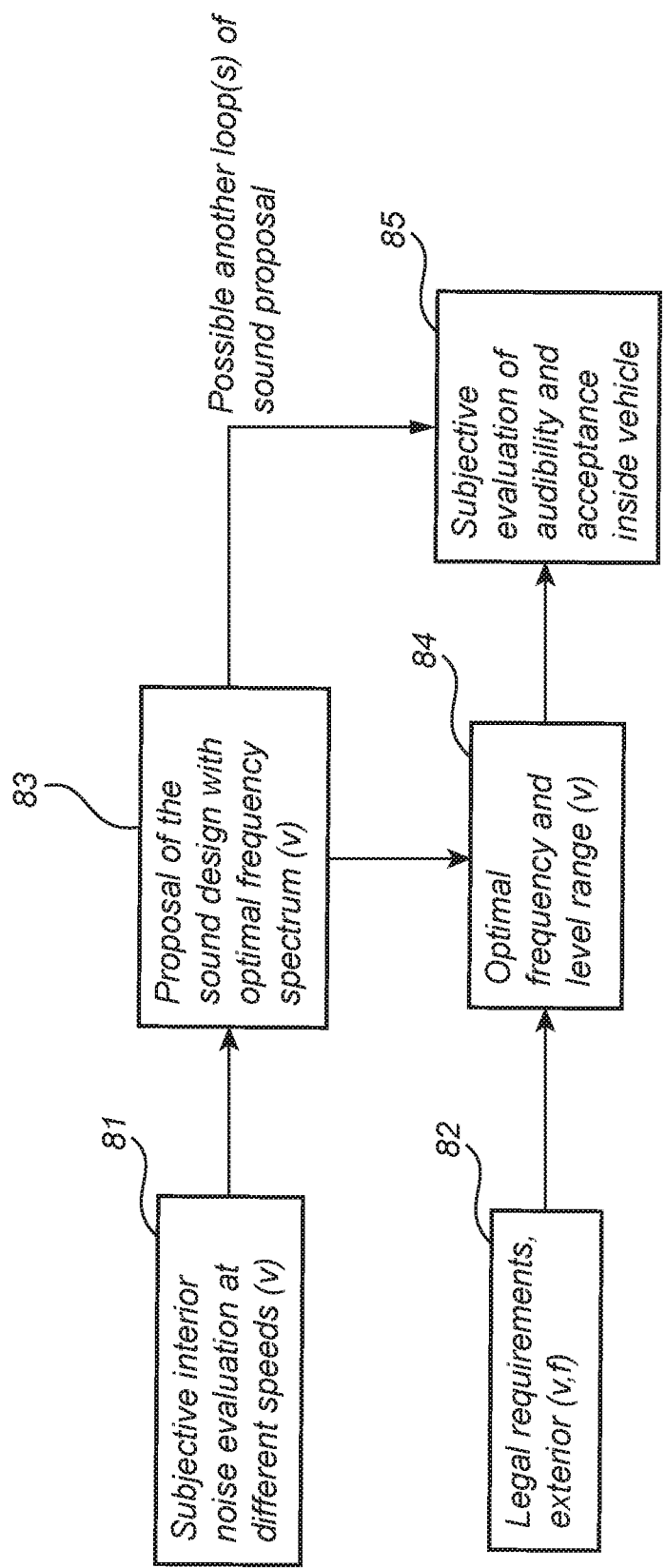
FIG. 8 presents the flowchart showing the method of providing an alert sound in electrified vehicles fulfilling the AVAS legal requirements shaped in a way that it mimics the interior noise subjectively assessed for different speeds during development process. An audibility of the alert sound and its annoyance are judged subjectively and another loop of the sound design is possible.

FIG. 8 presents the flowchart showing the method of providing an alert sound in electrified vehicles fulfilling the AVAS legal requirements. The interior noise 81 is subjectively evaluated for different speeds during the development process. The proposal for the emitted sound 83 is created based on subjective evaluation 81. The sound is created in such a way that it mimics the vehicle functional sounds (road noise, air conditioning, wind noise etc.) so that it is masked by vehicle sounds or blends in with the existing vehicle sounds. Consequently, the idea is that the regular customer will not find the sound as artificially added. The proposal of the sound 83 is checked for the optimal frequency bands and level range 84 to see if it fulfills the legal requirement(s) for a given jurisdiction. The optimal frequency bands and level range 84 are speed dependent and are chosen based on the legal requirements for the exterior 83. Since in this method the sound evaluation and characteristic of the emitted sound concept is based only on subjective assessment of the interior noise, it is proposed that a further step of subjective evaluation of the audibility and acceptance inside vehicle 85 is also included. The audibility and level of annoyance of the sound proposal should be judged by a designer and possibly by a larger panel of listeners. If the sound proposal is not judged acceptable another loop(s) of the sound design is recommended for different speeds (as demanded in legal requirements). The final proposal fulfills the legal requirement and its character is optimized for the interior noise, but depends greatly on the subjective evaluation of the sound.

Figure 9A:
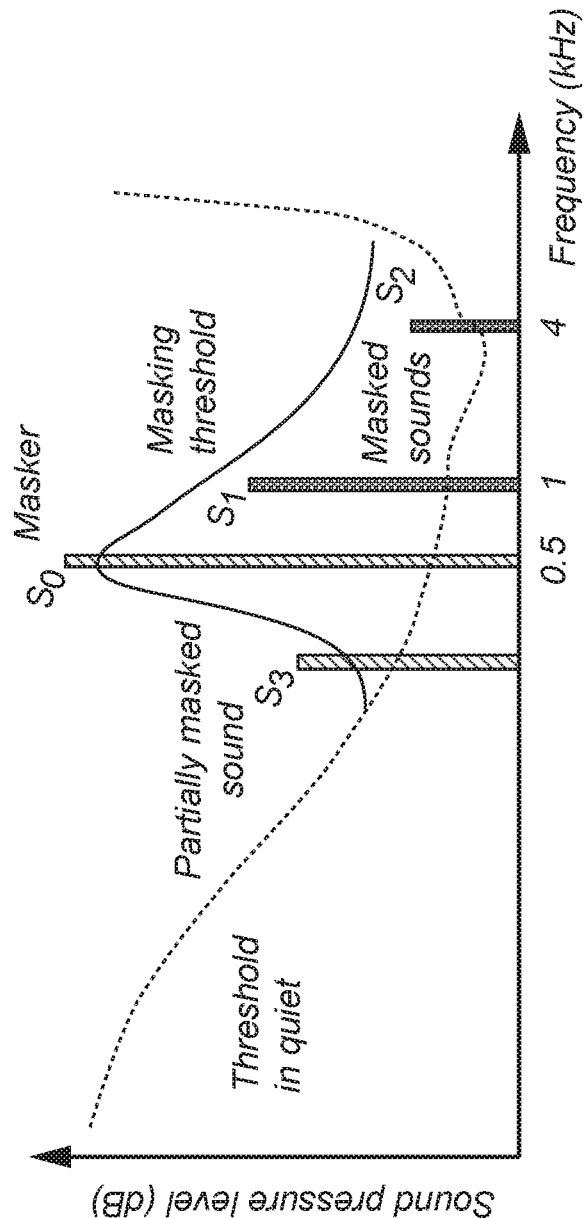
FIG. 9a presents the concept of the masked hearing threshold.
Figure 9B:
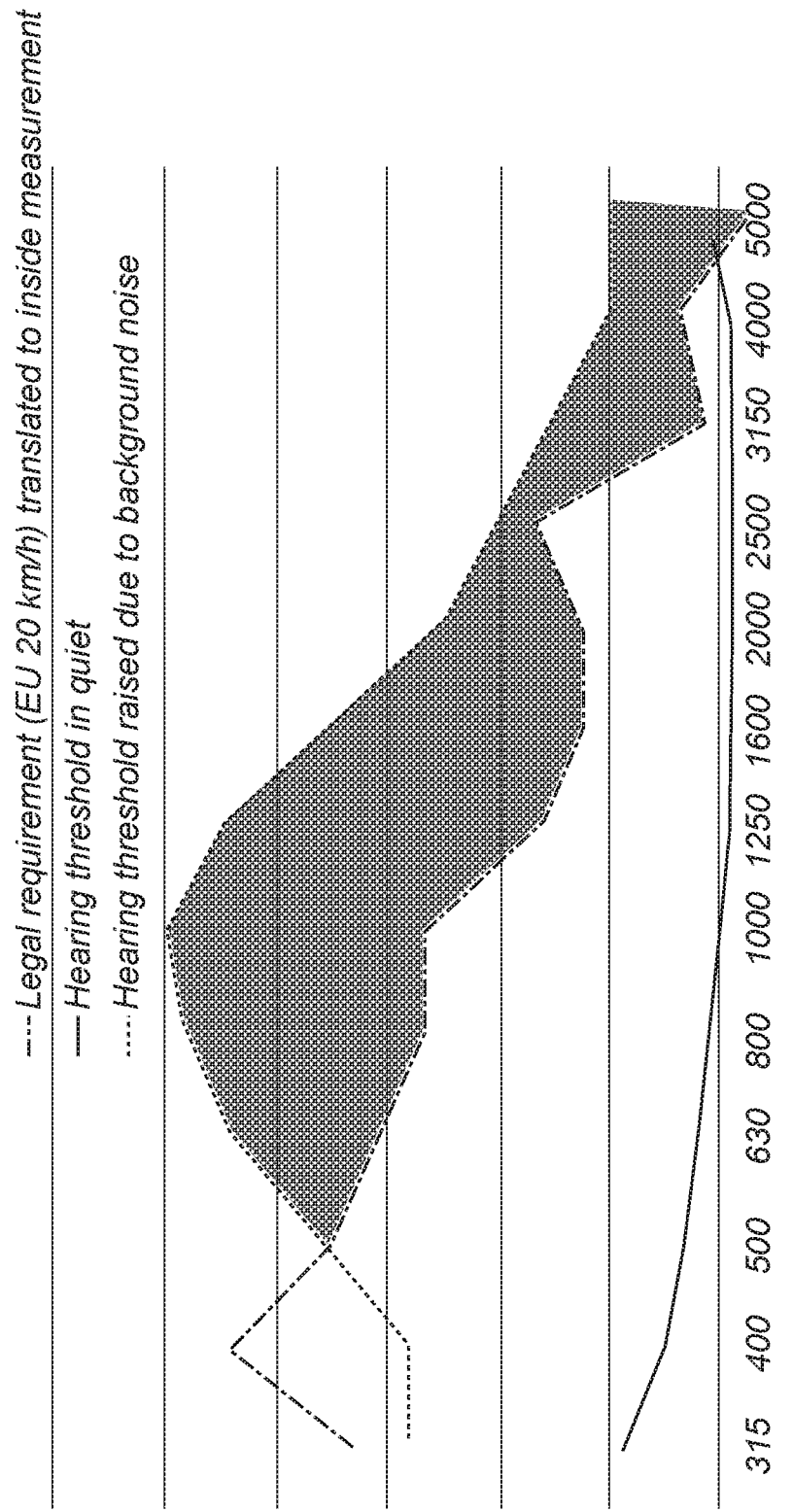
FIG. 9b shows that the hearing threshold is raised due to interior background noise (caused by tires, air conditioning, etc.) and the legal requirements translated to interior levels. The hatched area between these curves is the optimal design space for AVAS; loud enough to fulfil exterior requirements, yet quiet enough to be masked by background noise.

FIGS. 9a and 9b presents the concept of the "masked hearing" threshold. The hearing threshold in quiet defines the level at which sound (shown in dB, vertical axis) is not audible (dashed line in FIG. 9a) at a given frequency (horizontal axis). This hearing threshold is raised when sounds (s0, s3) are present as shown by the solid line in FIG. 9a. The new masked threshold is then causing quieter sounds, s1 and s2 to become inaudible in presence of these masker sounds. FIG. 9b shows an example of how the hearing threshold in quiet (lowest line) is raised in the presence of background noise (to the highest line). Sounds beneath the uppermost line are thus not heard. This masked hearing threshold can be calculated using any of the methods presented in Lin & Abdulla (2015) or similar methods. (Lin Y., Abdulla W. H. (2015) Principles of Psychoacoustics. In: Audio Watermark. Springer, Cham) the contents of which are incorporated herein by reference thereto.

FIG. 9b also shows an example of how loud the AVAS sound needs to be, as measured on the inside of the vehicle, to fulfil the legal requirements (this curve can be derived using the exterior-to-interior transfer functions). The optimal design space for the AVAS sound is shown by the hatched area in FIG. 9b. In this area, the sound is loud enough to fulfil the legal requirements but still quiet enough not to be heard on the inside of the vehicle.

Figure 10:
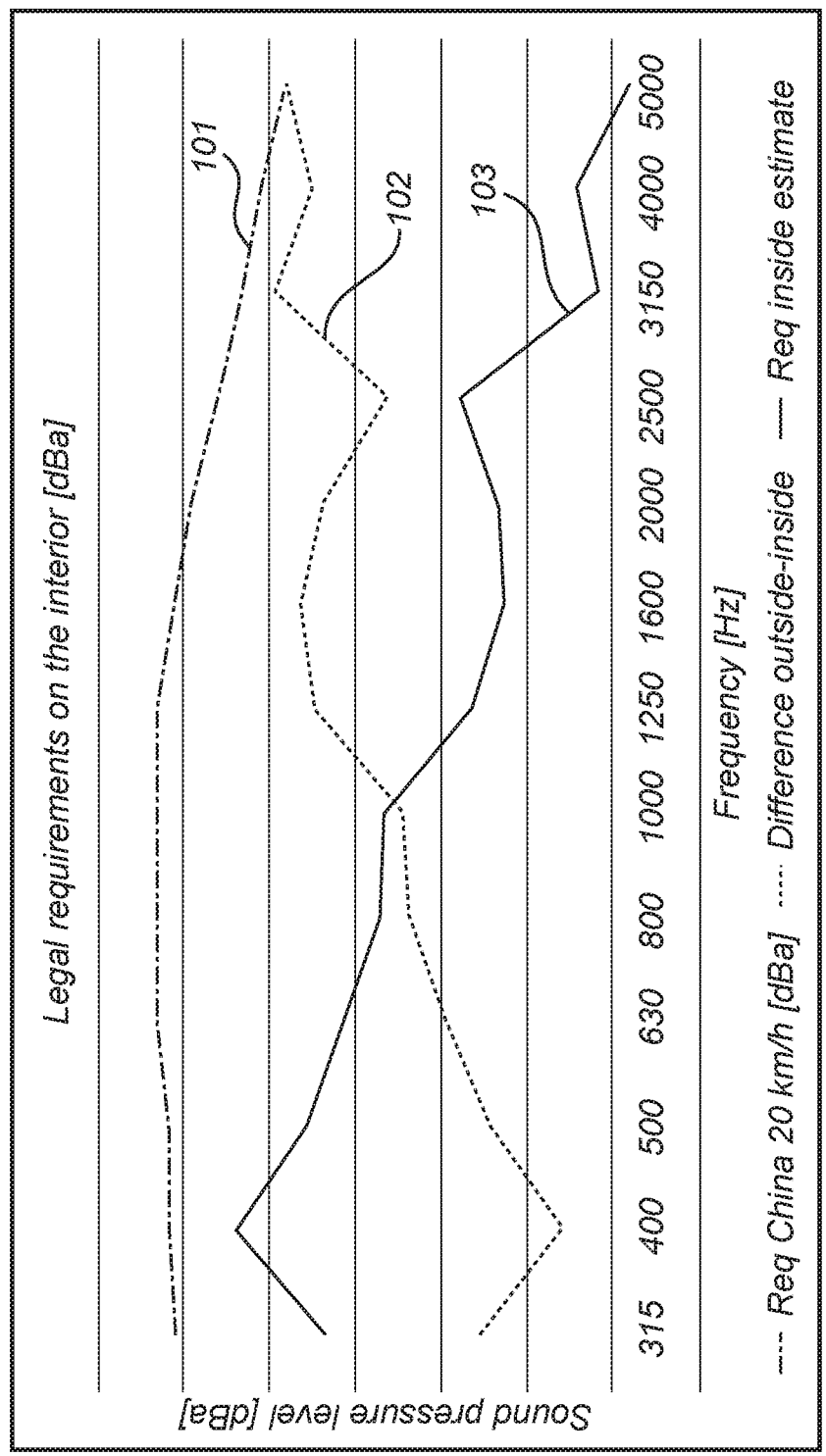
FIG. 10 is an example of how the legal requirements that demand the specific frequency bands and sound level ranges is translated towards the interior requirements.
Figure 11:
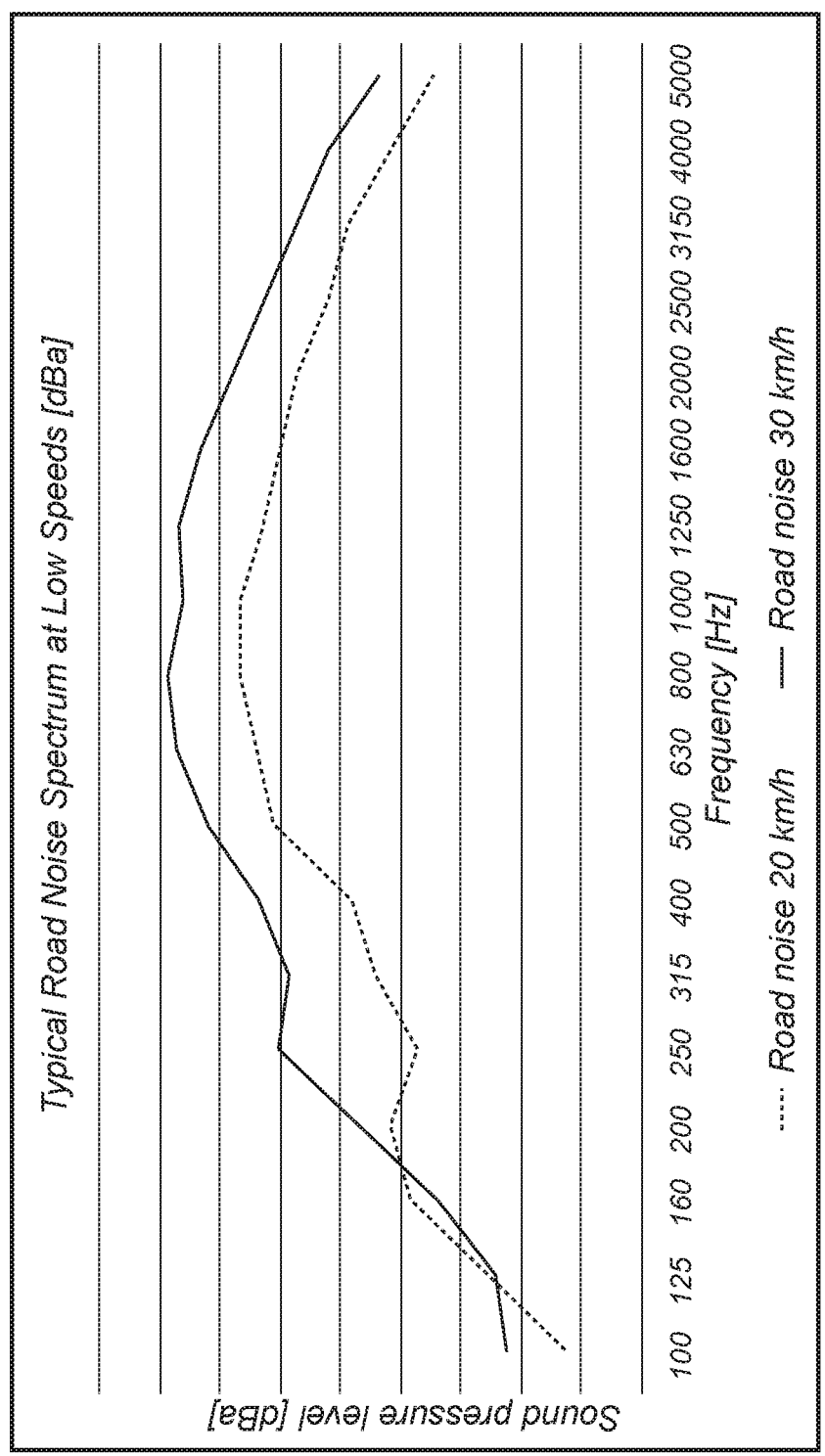
FIG. 11 presents the data that is typical for the road noise at low speeds (20 km/h and 30 km/h).

FIG. 10 is an example of how the legal requirements that demand the specific frequency bands and sound level ranges could be translated towards the interior. The sound level required by Chinese legislation at 20 km/h 101 is presented in the graph. The exterior-to interior difference 102 is calculated using the measured transfer functions describing the sound path from the speaker(s) to the interior microphone(s) are denoted TFFI for the forward drive and TFRI for the reverse drive. Subtracting the exterior-to-interior difference 102 from legal requirements on the outside gives the legal requirements on the inside 103. Such a representation makes it easier to define and design an alert sound from the interior perspective.

FIG. 11 presents the data that is typical for the road noise at low speeds (20 km/h and 30 km/h). The sound pressure level graphs show that the maximum level of the typical road noise is centered around 800-1000 Hz. Similar typical road noise frequency spectra can be found in i.e. Júlio A. Cordioli Mario Triches Jr. Samir N. Y. Gerges (2004) Applications of the Statistical Energy Analysis to vibro-acoustic modeling of vehicles; Massimo Garaia and Paolo Guidorzi (2000) European methodology for testing the airborne sound insulation characteristics of noise barriers in situ: Experimental verification and comparison with laboratory data, the contents of which are herein incorporated by reference thereto.

Figure 12:
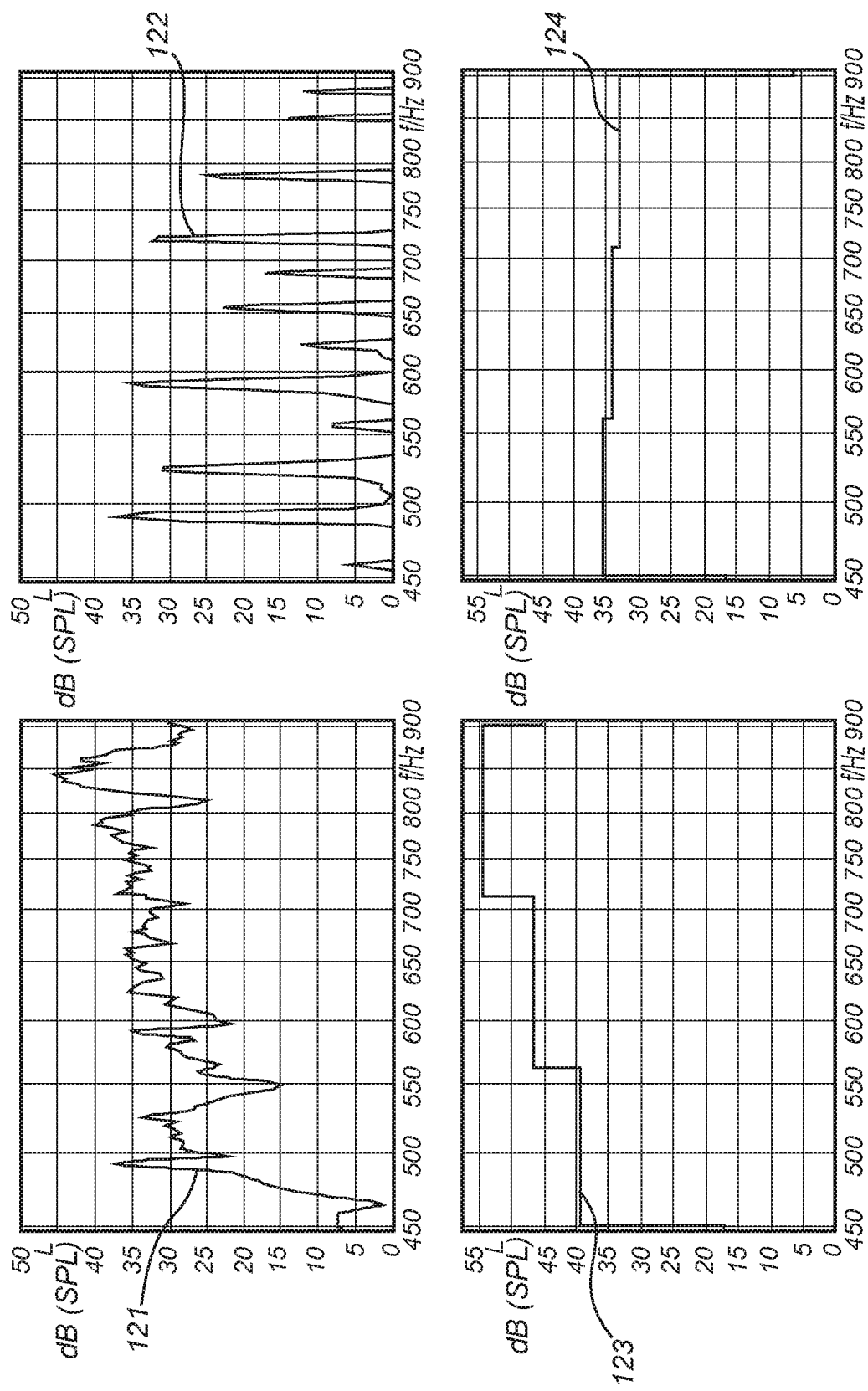
FIG. 12 presents the A-weighted frequency spectrum and A-weighted third octave spectrum to show the difference in the sound level when using tonal sound or "noise like" sound.

FIG. 12 presents the A-weighted frequency spectrum and A-weighted third octave spectrum to show the difference in the sound level when using tonal sound or "noise like" sound. The measurement of the two different sounds fitted in the electric vehicle was conducted with a microphone placed along the left side of the vehicle at 2 m distance from the centerline of the car (denoted as 1.1 in FIG. 1). The narrow band frequency spectrum of a noise like sound 121 is averaged to the third octave bands spectrum 122. The narrow band frequency spectrum of a tonal noise like sound 123 is averaged to the third octave bands spectrum 124. The graphs show that even if the peak levels of the two sound—noise like sound 121 and tonal sound 122—are similar the energy cumulated in the third octave band are higher for the noise like sound 123.

An example of how to design an AVAS sound according to at least one embodiment of the invention is as follows:

The transfer functions (TFs) of the vehicle and sound emitting units (SEUs) are measured: TFs from SEUs to the left and right (and possibly to front for the specific case of stationary condition) exterior microphones, placed according to legal requirements, and TFs from the SEUs to interior microphones, placed where e.g. the driver usually has his/her ears.

The differences between left and right (and possibly front) exterior microphone TFs are then calculated for each third octave band. Also, the differences between exterior TFs and interior TFs are calculated.

The optimal frequency bands are selected. These are characterized by a low difference between exterior microphone TFs and high difference between exterior and interior microphone TFs. The low difference between exterior microphone TFs guarantees the uniform distribution of the sound outside of the vehicle, ensuring that sound levels are the same in each measurement point (the situation when the levels are much lower in one of the microphones than in the other(s) is not preferred). The high difference between exterior and interior microphone TFs guarantees that the sound emitted from SEUs are maximally attenuated towards the interior, meaning that the emitted sound is inaudible or unobtrusive towards the interior.

Usually, two or more frequency bands are needed to fulfil legal requirements.

The TFs are then used to translate the legal requirements (which are defined on the exterior of the vehicle) to interior requirements. This is done by taking the exterior legally required levels and subtracting the exterior-to-interior level difference.

The interior background noise is recorded in a driving vehicle (with any AVAS sound switched off) at the necessary measured speeds, as per legal guidelines, and at different vehicle speeds of interest, for example at 10 and 20 km/h. The recording position should correspond to the location used in 1).

The masking threshold by the interior background noise is then calculated for the different speeds using e.g. the methods presented in Lin & Abdulla (2015).

The optimized sound is then created. This is done by feeding a sound (preferably noise-like) through band-pass filters having cutoff frequencies according to the optimal frequency bands, described in 3) above, and then feeding it to the SEU(s). The interior sound is then measured for simulated different speeds as required by legal (at standstill and in the same position as in 1)) and adjusted level-wise until it exceeds the interior legal requirements (calculated in 4) above) but does not exceed the masking threshold. Some adjustments of the sounds' spectral characteristics within each frequency band may be necessary to make sure that the sound is entirely masked by the interior noise. The emitted sound is speed dependent, meaning that its pitch and level are changing with accord to legal requirements and match the vehicle movement. The emitted sound is measured on the exterior as well to verify that it fulfils the legal requirements. The process is repeated, still in standstill, for each background noise of interest (corresponding to the different speeds of interest).

The sound proposal can also be created as explained in FIG. 6 or FIG. 7. In these cases, the TFs for exterior and interior microphones do not need to be measured. Instead only the frequency spectrum of the pre-recorded interior functional vehicle sounds for different speeds or the frequency spectrum of the predicted/generic road noise are required. This data on frequency is to create the optimal characteristic of the emitted sound so that it mimics already existing sounds in the car. Essentially, this data on interior noise frequency spectrum is used to evaluate the optimal frequency bands for the emitted sound. The emitted sound is measured at the microphones outside of the vehicle, placed according to legal requirements, to ensure fulfilling the legal requirements. The emitted sound is subjectively evaluated on its audibility and level of acceptance and another loop(s) of sound design is possible if needed.

The sound proposal can be also created as explained in FIG. 8. In this case the TFs for exterior and interior microphones do not need to be measured. Instead only the subjective evaluation of functional vehicle sounds for different speeds is done. Based on the evaluation the proposal of the sound is created. The emitted sound is measured at the microphones outside of the vehicle, placed according to legal requirements, to ensure fulfilling the legal requirements. The emitted sound is subjectively evaluated on its audibility and level of acceptance and another loop(s) of sound design is possible if needed.

What is claimed is:

1. A method of creating and providing an alert sound to be emitted by a specified electrified vehicle to fulfil Acoustic Vehicle Alerting System requirements for the specified vehicle, comprising the steps of:

selecting a specified vehicle;

operating the vehicle in an electrified condition to create operational sounds of the vehicle and creating a first recording of those sounds interiorly and exteriorly to the vehicle;

emitting the first recorded sounds from sound emitting units mounted to the vehicle and making a second recording of those emitted sounds at more than one first specified location exterior to the vehicle and at a second specified location interior to the vehicle;

determining a transfer function of the emitted sounds between respective exterior recording locations and from the exterior recording locations to the interior recording location;

selecting and shaping the second sound recording in accord with choosing the exterior sounds with the highest transfer functions from at least one of said first specified exterior recording locations to at least a second specified exterior recording location and, in accord with those sounds having the lowest transfer function from exterior to interior recording locations, shaping the selected sound in accord with specified sound pressure and frequency requirements for the specified vehicle in order to meet those requirements; and, emitting those selected and shaped sounds from the sound emitting units as the alert sound for the acoustic alert system for the specified vehicle.

2. A method as in claim 1, further comprising the steps of:

selecting and shaping the emitted sounds of the acoustic vehicle alert system for the specified vehicle in reliance on the first recording of interior operational sounds of the specified vehicle, wherein the selecting and shaping of the emitted sound is performed so to mask the emitted alert sound as to the interior of the vehicle by the existing operational sounds of the specified vehicle made at specified speeds for which an acoustic alert sound is required and, at the same time, meet specified interior sound and frequency requirements for interior sound of the alert system.

3. A method as in claim 2, further comprising the steps of:

evaluating, subjectively and for different vehicle speeds, an audibility and acceptance level of the emitted alert sound inside the specified vehicle and whether the alert sound is judged as coherent and acceptable to operators of the specified vehicle.

4. A method as in claim 3, further comprising the steps of:

evaluating, for a second time, subjectively and for different vehicles speeds, relying on a panel of listeners, an acceptable auditory result of the shaped and emitted alert sound.

5. A method as in claim 1, further comprising the steps of:

selecting and shaping the emitted sounds of the acoustic vehicle alert system for the specified vehicle in reliance on typically predicted interior operational sounds of the specified vehicle, wherein the selecting and shaping of the emitted sound is performed so to mask the emitted alert sound as to the interior of the vehicle by the typically predicted operational sounds of the specified vehicle made at specified speeds for which an acoustic alert sound is required and, at the same time, meet specified interior sound and frequency requirements for interior sound of the alert system.

6. A method as in claim 5, further comprising the steps of:

evaluating, subjectively and for different vehicle speeds, an audibility and acceptance level of the emitted alert sound inside the specified vehicle and whether the alert sound is judged as coherent and acceptable to operators of the specified vehicle.

7. A method as in claim 1, further comprising:

creating a third recording of active feedback of current noise spectra of road noise and other functional vehicle sounds interiorly during active usage of the specified vehicle, updating the recorded current noise spectra on a constant basis using the third recording, and further shaping the emitted alert sound so as to mask the emitted alert sound interiorly to the specified vehicle taking into account the updated current interior noise spectra of the specified vehicle in operation.

8. A method as in claim 7, further comprising the steps of:

evaluating, subjectively and for different vehicle speeds, an audibility and acceptance level of the emitted alert sound inside the specified vehicle and whether the alert sound is judged as coherent and acceptable to operators of the specified vehicle.

9. A method of creating and providing an alert sound to be emitted by a specified electrified vehicle to fulfil Acoustic Vehicle Alerting System requirements for the specified vehicle, comprising the steps of:

selecting a specified vehicle;

operating the vehicle in an electrified condition to create operational sounds of the vehicle and creating a first recording of those sounds exteriorly to the vehicle;

emitting the first recorded sounds from sound emitting units mounted to the vehicle and making a second recording of those emitted sounds at more than one first specified location exterior to the vehicle and at a second specified location interior to the vehicle;

determining a transfer function of the emitted sounds between respective exterior recording locations and from the exterior recording locations to the interior recording location;

selecting and shaping the second sound recording in accord with choosing the exterior sounds with the highest transfer functions from at least one of said first specified exterior recording locations to at least a second specified exterior recording location, and in accord with those sounds having the lowest transfer function from exterior to interior recording locations, and shaping the selected sound in accord with specified sound pressure and frequency requirements in order to meet those requirements; and, emitting those selected and shaped sounds from the sound emitting units as the alert sound for the acoustic alert system for the specified vehicle.

10. A method as in claim 9, further comprising the steps of:

selecting and shaping the emitted sounds of the acoustic vehicle alert system for the specified vehicle in reliance on typically predicted interior operational sounds of the specified vehicle, wherein the selecting and shaping of the emitted sound is performed so to mask the emitted alert sound as to the interior of the vehicle by the typically predicted interior operational sounds of the specified vehicle made at specified speeds for which an acoustic alert sound is required and, at the same time, meet specified interior sound and frequency requirements for interior sound of the alert system.

11. A method as in claim 10, further comprising the steps of:

evaluating, subjectively and for different vehicle speeds, an audibility and acceptance level of the emitted alert sound inside the specified vehicle and whether the alert sound is judged as coherent and acceptable to operators of the specified vehicle.

12. A method as in claim 11, further comprising the steps of:

evaluating, for a second time, subjectively and for different vehicles speeds, relying on a panel of listeners, an acceptable auditory result of the shaped and emitted alert sound.

13. A method of creating and providing an alert sound to be emitted by a specified electrified vehicle to fulfil Acoustic Vehicle Alerting System requirements for the specified vehicle, comprising the steps of:

selecting a specified vehicle;

operating the vehicle in an electrified condition to create operational sounds of the vehicle and creating a first recording of those sounds exteriorly to the vehicle;

emitting the first recorded sounds from sound emitting units mounted to the vehicle and making a second recording of those emitted sounds at more than one first specified location exterior to the vehicle;

predicting interior noise frequency spectrum of the specified vehicle based on typical road noise frequency spectrum for that vehicle and shaping the recorded sound relying on the frequency spectrum of the interior noise is to define optimal frequency bands and level range of the sound emitted from the sound emitting unit(s) so as to mimic the frequency spectrum of the predicted interior noise; and, emitting those selected and shaped sounds from the sound emitting units as the alert sound for the acoustic alert system for the specified vehicle so as meet alert sound requirements for that vehicle.

14. A method as in claim 13, further comprising the steps of:

subjectively evaluating, for different speeds, audibility inside the vehicle and assessing an acceptance level of the alert sound as coherent and acceptable.

15. A method as in claim 14, further comprising the steps of:

conducting a second subjective evaluation of the alert sound using a panel of listeners to assess as to alert sound coherence and acceptance.

16. A method of creating and providing an alert sound to be emitted by a specified electrified vehicle to fulfil Acoustic Vehicle Alerting System requirements for the specified vehicle, comprising the steps of:

selecting a specified vehicle;

operating the vehicle in an electrified condition to create operational sounds of the vehicle and creating a first recording of those sounds exteriorly to the vehicle;

emitting the first recorded sounds from sound emitting units mounted to the vehicle and making a second recording of those emitted sounds at more than one first specified location exterior to the vehicle;

shaping the second recorded sound relying on frequency spectrum of interior noise of the specified vehicle based on typical road noise frequency spectrum for that vehicle so as to define optimal frequency bands and level range of the sound emitted from the sound emitting unit(s) so as to mimic the frequency spectrum of the interior noise of the specified vehicle; and, emitting those selected and shaped sounds from the sound emitting units as the alert sound for the acoustic alert system for the specified vehicle so as meet alert sound requirements for that vehicle.

17. A method as in claim 16, further comprising the steps of:

subjectively evaluating, for different speeds, audibility inside the vehicle and assessing an acceptance level of the alert sound as coherent and acceptable.

18. A method as in claim 17, further comprising the steps of:

conducting a second subjective evaluation of the alert sound outside the vehicle using a panel of listeners to assess as to alert sound coherence and acceptance.

19. A method as in claim 18, wherein:

said second subjective evaluation is done for different speeds.

* * * * *